March 4, 1958  G. B. E. SCHUELER  2,825,107
METHOD OF MAKING HOLLOW SAND CORES FOR METAL CASTING
Filed Dec. 14, 1953
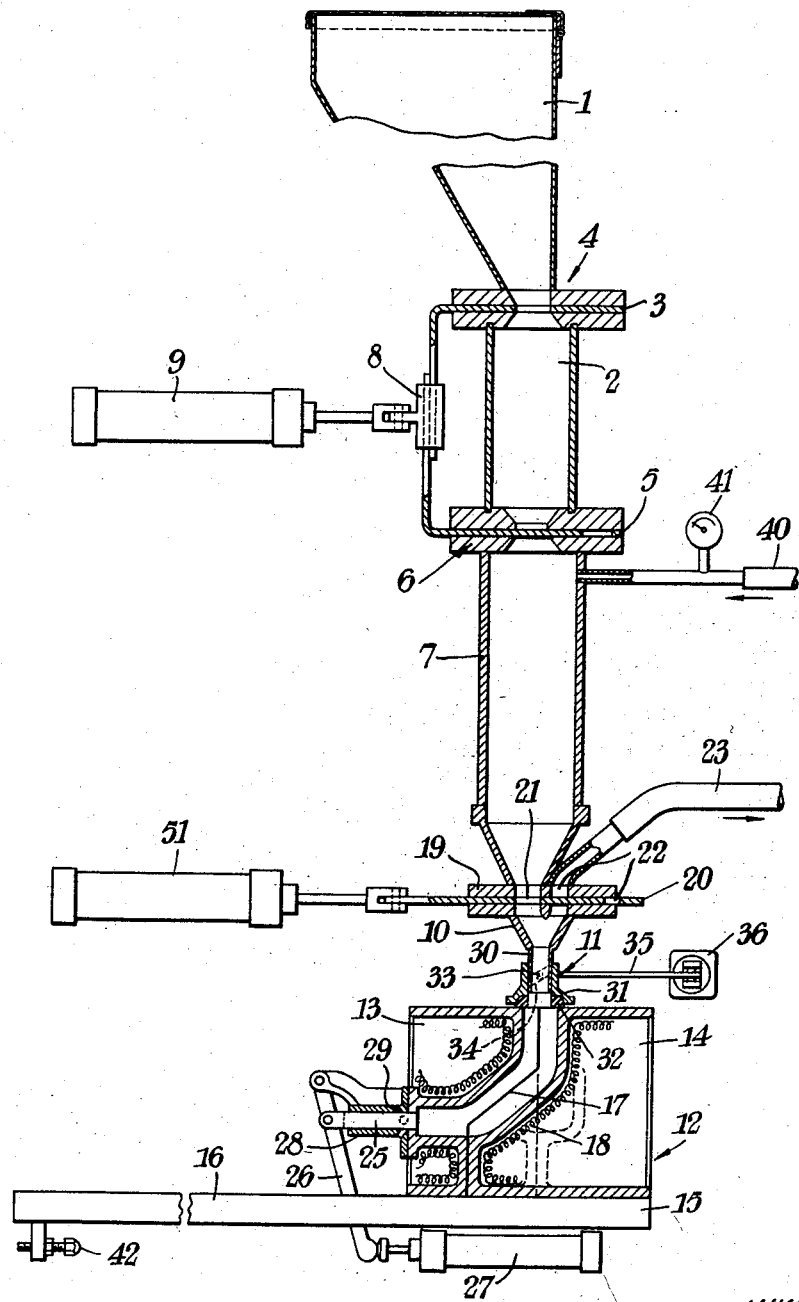
INVENTOR
GEORGE B. E. SCHUELER
BY
ATTORNEY

United States Patent Office 2,825,107
Patented Mar. 4, 1958

2,825,107

METHOD OF MAKING HOLLOW SAND CORES FOR METAL CASTING

George Berthold Edward Schueler, Hyde, England

Application December 14, 1953, Serial No. 398,127

Claims priority, application Great Britain December 16, 1952

6 Claims. (Cl. 22—194)

In producing hollow sand cores by introducing an intimate mixture of sand and a thermo-setting resin into a heated mould so that part of the mixture in the mould adheres together against the heated inner walls thereof, excess of the mixture being subsequently removed, it has been suggested to convey the mixture into the mould along with a stream of air. This is not wholly satisfactory, especially if the mould is of complicated design, because of uneven distribution of the mixture in the mould.

The main object of the invention is to ensure that the mixture is carried uniformly to all parts of the mould. Another object is to provide a process wherein the disability referred to is reduced or eliminated by suddenly blowing the mixture into a closed and heated mould.

A further object of the invention is to obtain a very uniform coating of the interior of the mould even with moulds of complicated design.

Yet another object is to produce a core having porous walls to enable a hardening accelerator, in powder or particle form, to be introduced in admixture with the sand and resin, the accelerator being such that at the temperature prevailing within the mould it decomposes and is converted to a vapour which permeates the porous walls of the core.

More specifically it is an object to bring a hardening accelerator into intimate contact (substantially throughout the thickness of the walls of the core) with the synthetic resin material so that hardening of the resin is accelerated substantially throughout the wall thickness. Stated another way, an object of the invention is substantially to reduce the curing time so that a higher rate of production results.

Yet a further object is to enable loose mixture in excess of requirements within the interior of the core (after formation of the core) to be withdrawn and, if necessary, re-used.

In carrying out this invention it is necessary that the mould be closed and by this is to be understood that escape of the mixture from the mould is substantially prevented, though air may leak from the mould through joints or the like.

A practical application of the present invention will now be described, merely by way of example, with reference to the accompanying drawing which is a diagrammatic sectional elevation of an apparatus for producing hollow sand cores in accordance with the present invention.

Referring to the drawing, the sand resin mixture, with or without a hardening accelerator, is contained in the hopper 1 and is delivered to a measuring chamber 2 when the slide 3 of the valve, generally indicated at 4, is opened. The mixture is discharged from the measuring chamber 2 when the slide 5 of a valve, generally indicated by the reference numeral 6, is opened, the material falling into a compartment 7. The valves 4 and 6 are connected, as at 8, to the ram of a jack 9, the arrangement being that the valves 4 and 6 alternately open and close.

The lower end of the compartment 7 communicates by way of a neck 10 and a sealing clamp 11 with a closed mould, which is indicated at 12. The mould comprises two parts 13 and 14 of which the part 14 is secured to a base plate 15 and the part 13 is supported on guides 16 for movement towards and away from the part 14, the mould 12 being split on the line 17. The mould is heated by electric heating elements 18 the temperature of which may be controlled in any known or convenient manner, e. g. by thermostats.

Communication between the compartment 7 and the neck 10 is regulated by a slide valve 19 of which the slide 20 is actuated by a jack 51.

The slide 20 has a pair of ports 21 and 22 of which 21 is associated with the compartment 7. Port 22 is associated with a suction pipe 23 and controls communication between pipe 23 and the neck 10. The function of the suction pipe 23 will be fully described hereinafter and it is sufficient at this stage to state that the pipe is provided to withdraw mixture from the mould which is in excess of the requirements for forming the core. In order that this may be done there is a plunger 25 which passes through the wall of the mould and is actuated by a lever system 26 from a jack 27. The plunger 25 is supported in a sleeve 28 having air vents 29, the arrangement being that the jack 27 may withdraw the plunger 25 from the mould to place the vents 29 in communication with the interior of the mould whereby air is drawn through the vents 29 into the mould to permit extraction of the excess material along the suction pipe 23. Material so withdrawn may be re-used, if so required.

The top of the compartment 7 is connected with a supply of compressed air by a pipe 40, a suitable valve (not shown) being provided to control the supply of compressed air to the compartment 7. Conveniently the compressed air may be at about 50–200 lbs./sq. in. The pressure within the compartment 7 will be indicated on a gauge 41.

In order that the mould part 13 may be moved along guide 16 for withdrawal of the core it is necessary that the connection between sealing clamp 11 and the mould, which of course must be airtight to ensure that the mixture is effectively introduced to the mould, is broken. To this end the neck 10 is provided with a tube 30 which is surrounded by the clamp 11 which comprises a sleeve 31 and a ring seal 32 of resilient material e. g. rubber or synthetic resin. The tube 30 carries outwardly projecting pins 33 which engage with helical slots or grooves 34 formed in the inner wall of the sleeve 31. The sleeve is connected by a link 35 with an actuator 36 for rotation of the sleeve 31 with consequent axial adjustment of the tube 30 either to press the sealing ring 32 against the top surface of the mould 12 or to withdraw the sleeve from the mould.

In use: a measured quantity of the mixture from the chamber 2 falls into the compartment 7. The amount of the mixture measured out is sufficient to fill the mould 12. When the mixture is introduced to the compartment 7 port 21 is closed by slide 20 and the mixture rests upon the slide and fills the lower part of the compartment 7. Compressed air is then admitted to the compartment which is brought to a required pressure and thereafter the valve 19 is actuated to open port 21 with the result that the mixture is suddenly blown through the neck 10 into the closed mould 12. The pneumatic pressure acts above the mass of the mixture resting on the slide 20 with the result that the mixture is shot into the closed mould. After an interval of time valve 19 is adjusted to close port 21 and thereafter to open port 22, the plunger 25 being at the same time withdrawn. The suction in the pipe 23 is thus applied to the interior of the mould to withdraw excess (i. e. loose) material therefrom, air being admitted through the vent holes 29 for this purpose. At the end of a required curing period sleeve 31 is moved away from the closed mould and part 13 thereof is moved along the guides 16 to open the mould for removal of the core. The latter operation may be performed by any known or convenient ejecting mechanism.

After ejection of the core the mould is again closed and sleeve 31 lowered to engage with the closed mould and thereafter the cycle of operations is repeated. When the mould is opened lever 26 engages a stationary and adjustable stop 42 which resets the plunger 25 in the position to close the vent holes 29. The jacks 9, 27 and 51 and the valve means regulating the supply of compressed air to the pressurising chamber 7 together with the actuator 36 are preferably inter-connected and regulated by timing means so that the cycle of operations is automatically performed.

By way of example only, the following time cycle of operations is set forth:

(a) The mixture falls from the measuring chamber 2 into the pressurising chamber 7 over a period of 4 seconds;

(b) The pressurising compartment is brought up the required pressure in 2 seconds;

(c) The mixture is blown into the mould during 3 seconds;

(d) The compressed air line 40 remains in communication with the compartment 7 so that the material within the mould is subjected to pressure for a period of 5 seconds;

(e) The compressed air supply is cut off and suction is applied to the mould for from 4 to 6 seconds;

(f) The material remaining in the mould is cured, the curing period being 106 seconds; and (g) The mould is opened and the core is ejected during 5 seconds.

After the core forming operation the mould requires to be cleaned and the surfaces thereof lubricated, if desired, for example, with silicone, e. g. the product sold under the trade name DC4 by the Dow Chemical Company. In order to ensure more continuous production a series of moulds may be mounted on a rotary table and brought in succession beneath the sleeve 31, the curing of the core and subsequent cleaning of the mould being performed while other moulds are being charged.

The particles of sand may have an individual covering or coating of resin. This may be achieved, for example, by mixing the sand with a solution of the resin in a solvent and drying out the solvent or by adding a solvent for the resin to the resin-sand mixture which is being mixed. In another method the resin-sand mixture may be hot rolled so that the resin just melts and covers the sand particles. After any of these processes the resin-sand mixture usually requires to be reground to break up any aggregates formed. In the re-grinding operation some of the resin usually breaks away and it is preferable to separate the fine powder from the main body of the mixture by sieving the mixture through a mesh of appropriate size. It has been found that the inclusion in the mixture of a small proportion of a lubricating agent e. g. calcium stearate, substantially improves the flowing properties of the particles forming the admixture both during the sieving operation and during the main operation of injecting the mixture into the heated mould. It is essential to remove any residual solvent from the mixture before the mixture is used.

A mixture which has been successfully used in some cases comprises 6,000 grammes of 100 mesh sand, 1,944 grammes of resin solution, e. g. made from a stage A or B phenolformaldehyde (although urea formaldehyde, melamic formaldehyde, or cresol formaldehyde may be used instead) 100 grammes of hexamethylenetetramine (as a hardening accelerator) and 108 grammes of calcium stearate.

When the mixture is introduced to the mould the mixture lying against the heated surfaces of the mould is bonded together by the resin and excess material is withdrawn by suction only after sufficient time has lapsed to ensure that the bonded material is self-supporting under the applied suction and that the thickness of the core has a required value.

In an alternative method the resin-sand mix is in a cartridge which is loaded into a gun the nozzle of which is connected by an air-tight connection to the mould opening. The mixture is shot by air pressure from the cartridge into the mould, the surface layer of the cartridge being sufficiently weakened to disintegrate under the pneumatic pressure.

On withdrawal of the plunger 25 the core wall formed against the end of the plunger is torn or broken away, the core wall being relatively soft when this occurs as the mixture has been in the heated mould only a short time (e. g. 5 seconds for the specific time cycle given above). It will be appreciated that the hardening of the core wall takes place almost entirely after evacuation of excess material i. e. subsequent to the withdrawal of plunger 25. As it is impracticable during casting that the molten metal be poured against the wall of the core torn by the plunger 25 it is arranged that the plunger 25 be located where the core is supported within the casting mould or at other equivalent positions.

In an alternative arrangement the neck 10 is supplied from a pair of independent hoppers each having an associated measuring chamber and pressurising compartment. One hopper contains a sand-resin mixture which will result in a high-grade surface finish i. e. having a relatively large quantity of resin (the mixture being therefore comparatively expensive) and the other hopper contains a relatively poor quality mixture e. g. a cheaper resin of inferior quality or a smaller quantity of the same resin. In any event the high quality mixture is first introduced as described above and thereafter the poorer quality mixture is introduced to the mould after withdrawal therefrom of excess of the high quality mixture. Subsequently excess of the poorer quality mixture is withdrawn. There results a hollow core of relatively thick wall having a skin of high surface finish and a thick strong backing of the poorer quality resin. A stronger core is thus produced without impairing the quality of its surface finish.

Other means for strengthening the core may be reinforcing elements of metal or the like positioned within the mould and around which the core is formed. A similar procedure may be adopted when providing pins or the like for accurately registering the core in the casting mould.

I claim:

1. Process for preparing hollow sand cores, which comprises introducing a predetermined quantity of an intimate dry mixture of sand and a thermosetting resin into a chamber communicating with a closed and heated mould by a valve-closed discharge outlet in the chamber closing the chamber to the atmosphere, subjecting the chamber to pneumatic pressure to compact the sand-resin mixture and to build up a predetermined pressure above the sand-resin mixture, and then opening the chamber at the point of communication with the mould, while the chamber is still under pressure, so as to cause the compacted sand-resin mixture to be shot into the mould.

2. Process for preparing hollow sand cores, which comprises introducing a predetermined quantity of an intimate dry mixture of sand and a thermosetting resin into a chamber communicating with a closed and heated mould by a valve-closed discharge outlet in the chamber, closing the chamber to the atmosphere, subjecting the chamber to pneumatic pressure to compact the sand-resin mixture and to build up a predetermined pressure above the sand-resin mixture, then opening the chamber at the point of communication with the mould, while the chamber is still under pressure, so as to cause the compacted sand-resin mixture to be shot into the mould, and, after the sand-resin mixture has set and formed a self-supporting layer on the surfaces of the mould, subjecting the mould to suction to withdraw loose sand-resin mixture in excess of the requirement from the mould.

3. Process for preparing hollow sand cores, which comprising introducing a predetermined quantity of an intimate dry mixture of sand and a thermosetting resin into a chamber communicating with a closed and heated mould by a valve-closed discharge outlet in the chamber, closing the chamber to the atmosphere, subjecting the chamber to pneumatic pressure to compact the sand-resin mixture and to build up a predetermined pressure above the sand-resin mixture, then opening the chamber at the point of communication with the mould, while the chamber is still under pressure, so as to cause the compacted sand-resin mixture to be shot into the mould, after the sand-resin mixture has set and formed a self-supporting layer on the surfaces of the mould, subjecting the mould to suction to withdraw loose sand-resin mixture in excess of the requirement from the mould, introducing into the mould another dry sand-resin mixture to form a backing for the core wall produced from the first sand-resin mixture and again subjecting the mould to suction to withdraw the other sand-resin mixture in excess of requirement from the mould.

4. Process for preparing hollow sand cores, which comprises introducing a predetermined quantity of an intimate dry mixture of sand and a thermosetting resin into a chamber substantially closed to the atmosphere and communicating with a closed and heated mould by a valve-closed discharge outlet in the chamber in such a manner that the outlet is filled with the sand-resin mixture, introducing compressed air into the chamber for compacting the sand-resin mixture and to build up a predetermined pressure above the mixture, and then opening the chamber at the discharge outlet, while the chamber is still under pressure, so as to cause the compacted sand-resin mixture to be shot into the mould.

5. Process for preparing hollow sand cores, which comprises introducing a predetermined quantity of an intimate dry mixture of sand and a thermosetting resin into a chamber substantially closed to the atmosphere and communicating with a closed and heated mould by a discharge outlet closed by a valve in the chamber in such a manner that the sand-resin mixture forms a bed on the valve and fills the discharge outlet, introducing compressed air into the chamber for compacting the sand-resin mixture, and then opening the chamber at the discharge outlet, while the chamber is still under pressure, so as to cause the compacted sand-resin mixture to be shot into the mould.

6. Process for preparing hollow sand cores, which comprises introducing a predetermined quantity of an intimate dry mixture of sand and a thermosetting resin into a chamber substantially closed to the atmosphere and communicating with a closed and heated mould by a discharge outlet closed by a valve in the chamber in such a manner that the sand-resin mixture forms a bed on the valve and fills the discharge outlet, introducing compressed air into the chamber for compacting the sand-resin mixture, and to build up a predetermined pressure above the sand-resin mixture, then opening the chamber at the discharge outlet, while the chamber is still under pressure, so as to cause the compacted sand-resin mixture to be shot into the mould, and, after the sand-resin mixture has set and formed a self-supporting layer on the surfaces of the mould, subjecting the mould to suction to withdraw loose sand-resin mixture in excess of the requirement from the mould.

References Cited in the file of this patent

UNITED STATES PATENTS

| | | |
|---|---|---|
| 1,856,352 | Morris et al. | May 3, 1932 |
| 1,950,632 | Romph | Mar. 13, 1934 |
| 2,133,027 | Honig | Oct. 11, 1938 |
| 2,563,643 | Ranek | Aug. 7, 1951 |
| 2,659,107 | De Bell | Nov. 17, 1953 |
| 2,688,780 | Anderson | Sept. 14, 1954 |

FOREIGN PATENTS

| | | |
|---|---|---|
| 650,507 | Great Britain | Feb. 28, 1951 |
| 620,779 | Germany | Oct. 26, 1935 |
| 643,165 | Germany | Mar. 30, 1937 |
| 832,934 | Germany | Mar. 3, 1952 |

OTHER REFERENCES

Foundry, November 1952, page 286.

Page 1 only of McCulloch article, "The C Process of Making Molds and Cores for Foundry Use," Fiat Final Report No. 1168. Office of Technical Services, Department of Commerce, Washington, D. C.